United States Patent [19]
Audet

[11] 3,779,095
[45] Dec. 18, 1973

[54] SINGLE CONTROL DEVICE FOR SIMULTANEOUS CONTROL OF THREE OR MORE COORDINATE FUNCTIONS

[76] Inventor: Jean P. Audet, 138 Mountain Ave., Summit, N.J. 07901

[22] Filed: Jan. 3, 1972

[21] Appl. No.: 214,583

[52] U.S. Cl. ............................................ 74/471 XY
[51] Int. Cl. ................................................ G05g 9/04
[58] Field of Search ................. 74/471 XY, 471 R; 200/6 A; 338/153

[56] References Cited
UNITED STATES PATENTS

| 2,452,033 | 10/1948 | Born | 338/153 X |
| 2,534,939 | 12/1950 | Alkire | 338/153 |
| 2,958,233 | 11/1960 | Johnson | 74/471 XY |
| 3,156,134 | 11/1964 | Forrester, Jr. | 74/471 XY |
| 3,550,466 | 12/1970 | Ham | 74/471 XY |

Primary Examiner—Milton Kaufman
Attorney—Michael B. Keehan

[57] ABSTRACT

A single control device for simultaneously controlling three coordinate functions is provided. The device comprises a shaft mounted in a base. The movement of the shaft is limited by the opening in a control surface having a multi-apex angle opening. An operating plate secured to the shaft functions to move motion transmitting control elements positioned in alignment with the apex angles of the opening in the control surface in an amount corresponding to the relative position of the control shaft to the apex angles in the control surface. The device is particularly suitable for use in video color mix control.

5 Claims, 6 Drawing Figures

SINGLE CONTROL DEVICE FOR SIMULTANEOUS CONTROL OF THREE OR MORE COORDINATE FUNCTIONS

This invention relates to a device for simultaneously changing the value of at least three coordinate functions with movement of a single lever. Coordinate functions are functions which vary in relation to each other in some fixed or definable manner.

Control devices for controlling two coordinate functions such as stop-go, up-down functions and the like are known. Control of three coordinate functions is a more difficult problem. Some devices for control of three coordinate functions are known in which two functions are controlled directly with a lever and the third function is controlled by a determination of the relative values of the two directly controlled functions. Such a determination can be made by a computer which in turn controls the third function.

The control device of this invention provides a comparatively simple mechanical means of controlling three or more coordinate functions.

The single lever control device of this invention is fully explained in the drawings and description which follows. In the drawings, like numbers refer to like parts where applicable.

Figure 4A:
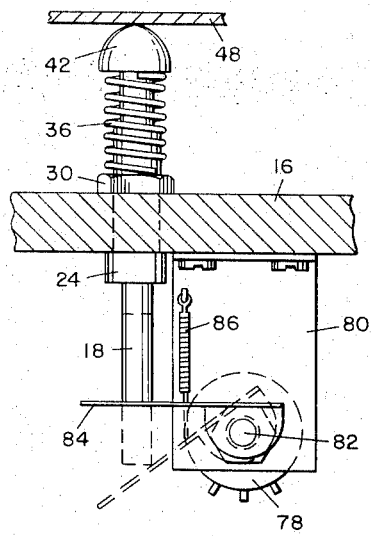
Figure 4B:
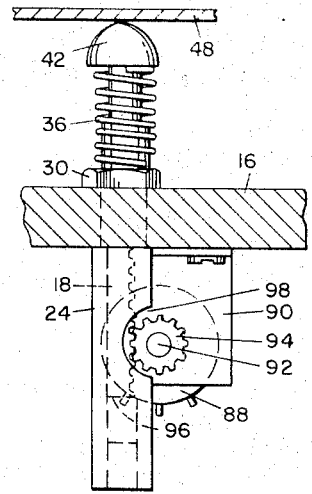

FIGS. 4(a) and 4(b) are side elevations of indirect control elements employed with the control device of this invention.

Figure 5:
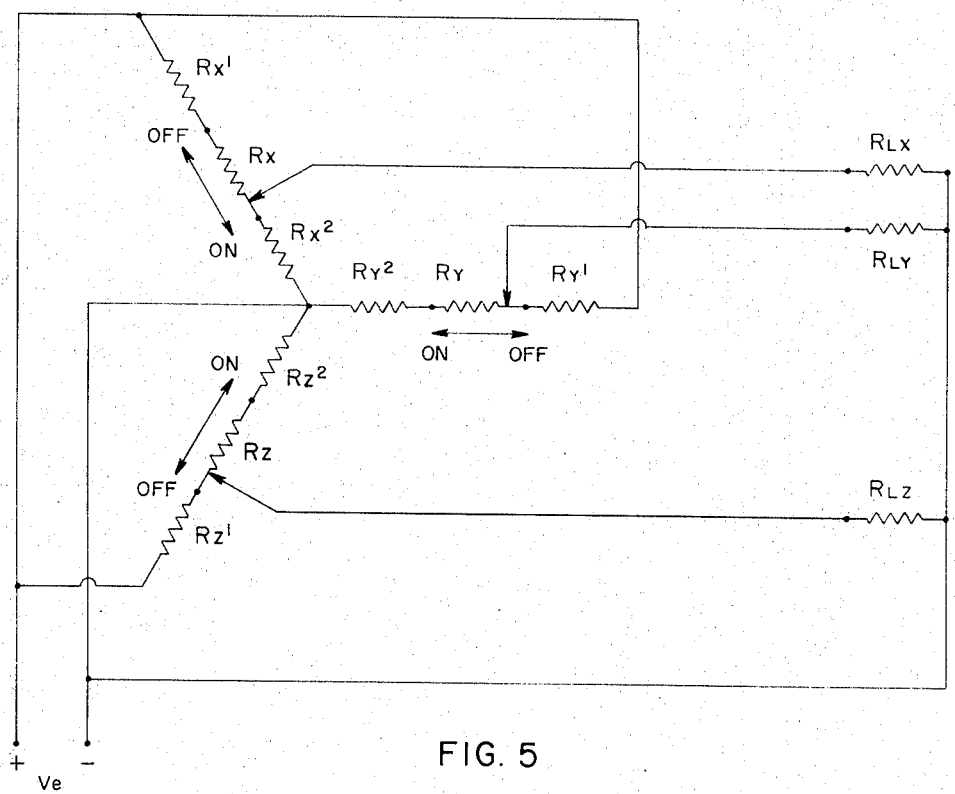

FIG. 5 is a schematic diagram of a typical electrical circuit for controlling coordinate functions when the functions are controlled electrically by changes in a variable resistor communicatively connected to the motion transmitting control elements.

Figure 1:
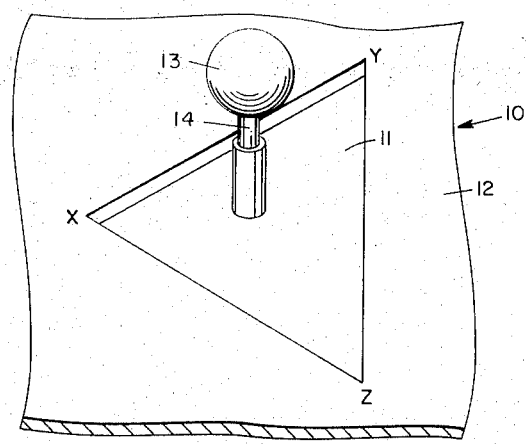
FIG. 1 is a schematic view of a panel mount of the device of this invention.

In FIG. 1 a portion of a control panel 10 for mixing and multiplexing of three television video signals is shown. Coordinates X, Y, and Z define a geometrical opening 11 in the control surface 12 corresponding geometrically to an equi-lateral triangle with X, Y, and Z representing the three apex angles of the equi-lateral triangle. A control knob 13 is attached to one end of control shaft 14 which is movable in all directions within the geometrical opening 11 in control surface 12.

Figure 3:
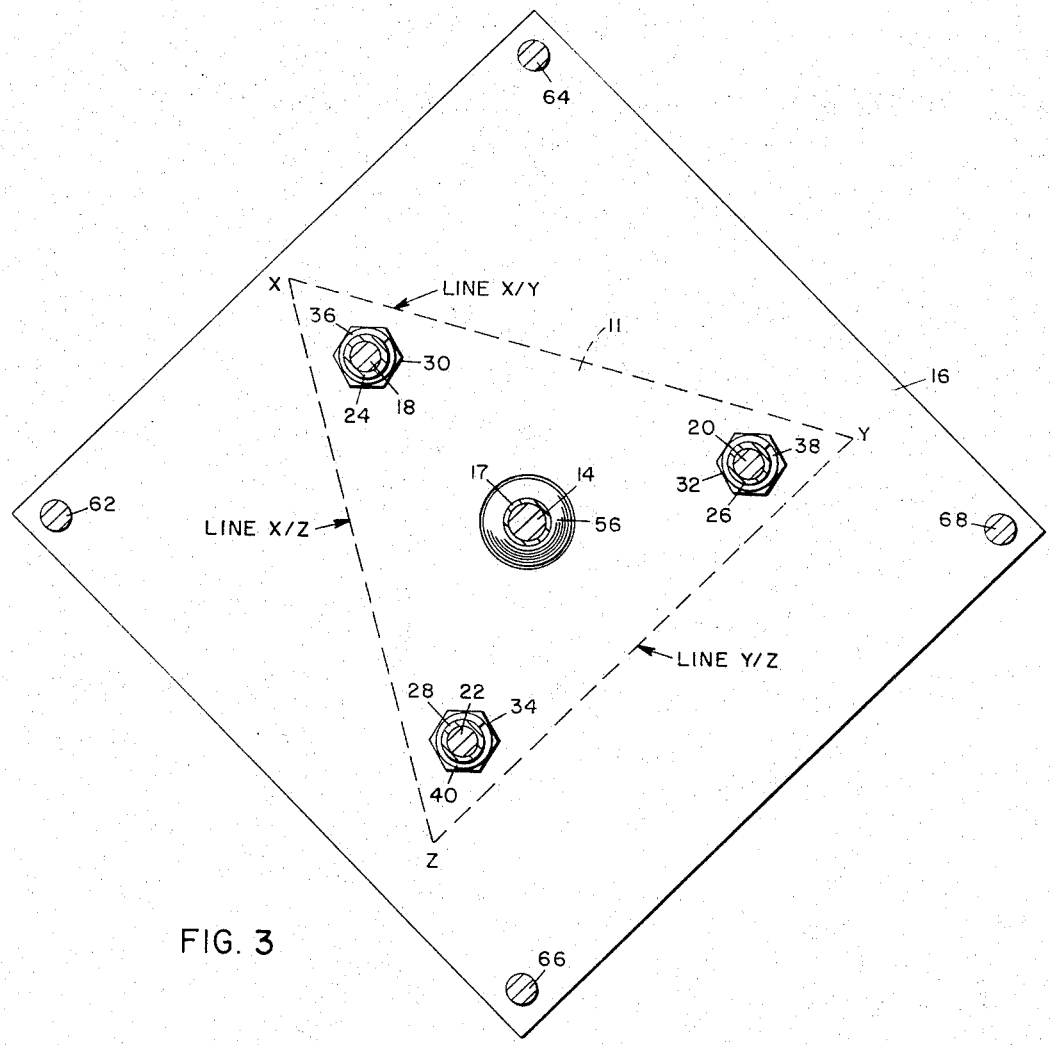
FIG. 3 is a view taken along lines 3—3 in FIG. 2.
Figure 2:
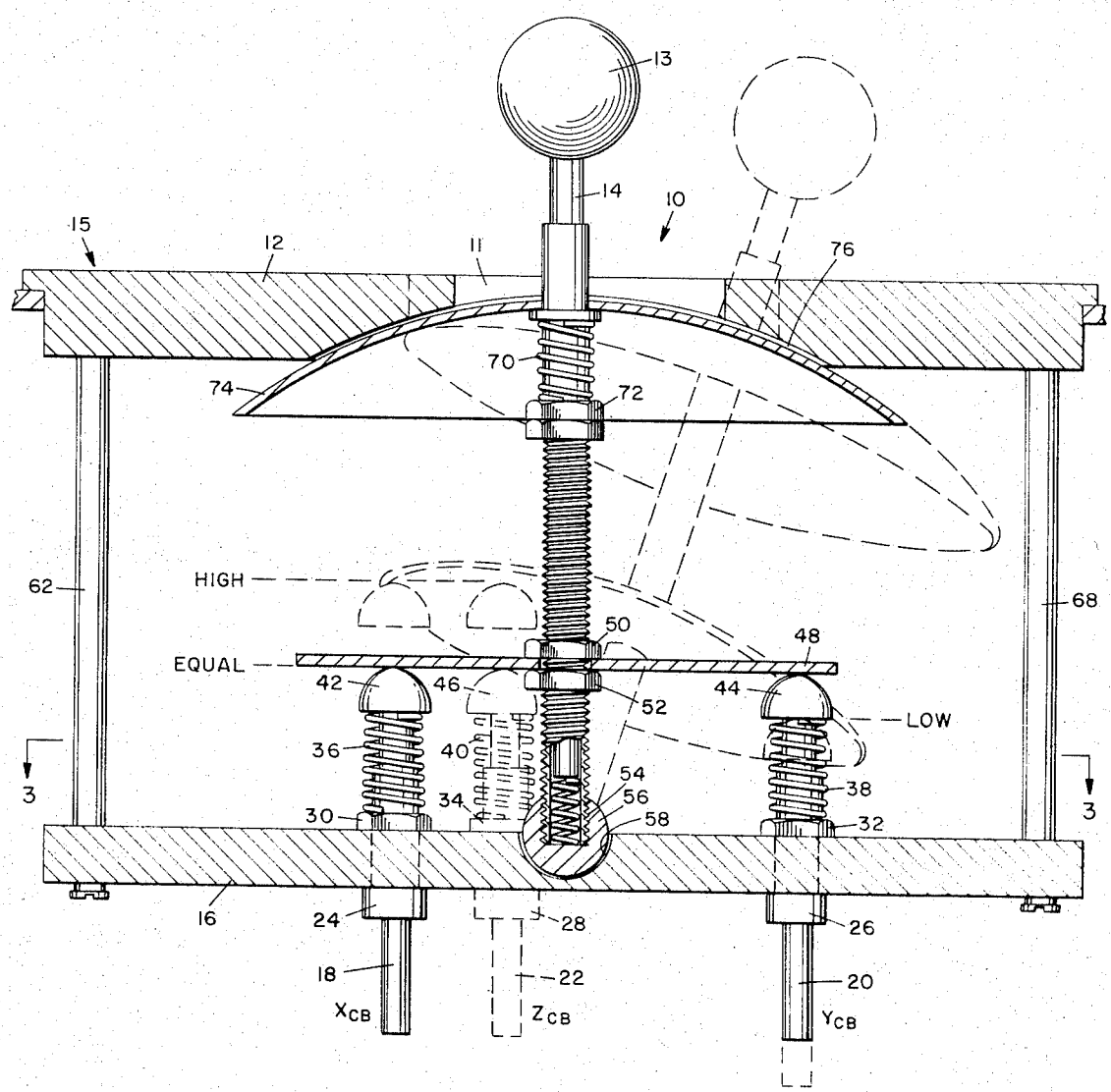
FIG. 2 is a side elevation view of the control device of this invention, partly in section.

In FIGS. 2 and 3 the control device of this invention is illustrated. The control device is comprised of a housing 15 which comprises control surface 12 and control base 16 which are spaced apart and in parallel relationship. Motion transmitting control elements 18, 20 and 22 are each housed by sleeve bushings 24, 26, and 28 respectively which sleeve bushings are secured into mounting holes $X_{cb}$, $Y_{cb}$ and $Z_{cb}$ in control base ($_{cb}$) 16. Mounting holes $X_{cb}$, $Y_{cb}$ and $Z_{cb}$ are aligned in control base 16 with the apex angles X, Y and Z of opening 11 in control surface 12. The sleeve bushings 24, 26 and 28 are flanged and threaded and secured in their respective mounting holes by nuts 30, 32 and 34. The motion transmitting control elements 18, 20, 22 are each encircled by springs (normally uncompressed) 36, 38, 40. The springs 36, 38, 40 are held to control elements 18, 20, 22 by caps 42, 44, 46. Motion transmitting control elements are capable of reciprocating movement within sleeve bushings 24, 26, 28 as described. An operating plate 48 is secured to a threaded portion of the control shaft 14 by the two nuts 50 and 52 so that the plane of its major surfaces forms a 90 degree angle with shaft 14. The control shaft 14 is fitted at its base end 54 with a ball 56 which is capable of partial rotation within socket 58. Socket 58 is located in control base 16 at a point aligned immediately below the center of the control surface opening 11. Rods 62, 64, 66 and 68 secure the control base 16 and space the control base 16 from control surface 12. Rods 62, 64, 66, 68 establish a uniform distance between control base 16 and control surface 12 so that when the control shaft 14 is passed through the opening 11 and the control shaft ball 56 is mated with socket 58, the angle formed by the said shaft and the control base 16 or control surface 12 is 90° when the said shaft 14 is centered in the opening 11. The spacing is also established so that the shaft 14 is at some convenient operating angle when the said shaft 14 is at rest against the control surface 12 at any of the apex points, X, Y or Z. The operating plate 48 is secured to the shaft 14 at a height above the control base 16 so that when the said shaft 14 is at rest within the control surface opening 11 at any of the apex positions X, Y or Z, the operating plate 48 will make contact with an associated control rod 18, 20 or 22 depressing the said rod against its compression spring 36, 38, 40. Positioning of the control shaft 14 in the center of the control surface opening 11 causes the operating plate 48 to equally depress the three rods 18, 20, 22 against their compression springs 36, 38, 40. Moving the control shaft 14 to a position of rest at apex point X of the control surface opening 11 along the line X/Y formed by the said opening causes the control rod 18 (corresponding to coordinate function X) to be fully depressed against its compression spring 36 by the operating plate 48 and the control rods 20 and 22 (corresponding to coordinate functions Y and Z respectively) to be fully extended against the lower surface of the operating plate 48 by action of their respective compression springs 38 and 40. As the control shaft 14 is moved along line X/Y toward apex angle Y, control rod 20 would be caused to be gradually depressed by the operating plate 48 as simultaneously the compression spring 36 would be allowed by the operating plate to raise the position of control rod 18. During the said X/Y movement of the control shaft 14 the operating plate 48 is pivoting about the point formed by the top of the cap 46 (corresponding to coordinate function Z) so that no change in position of control rod 22 occurs. Similar movements of the control shaft 14 along the lines formed by X/Z and Y/Z would produce similar movements such as just described. Movement of the control shaft 14 from apex point X along the said line X/Y to a point midway on line X/Y and thence directly within the control surface opening 11 to apex point Z will cause the control rods to be moved from initial position of fully depressed rod 18 and fully extended rods 20, 22 and to final positions of fully depressed rod 22 and fully extended rods 18 and 20. It is, of course, understood that during the course of the said movements, the control rods would pass through various positions of extension and depression corresponding to the position of the control shaft 14 within surface opening 11. The control shaft 14 can be made to control any number of coordinate functions by arranging a suitable geometrical control surface opening 11 and aligning control rods on the control base 16 at the proper points with reference to the apex points of the said opening.

In the device of this invention the control shaft 14 can be secured within control base 16 by means of a ball-socket 56, 58. Control shaft 14 is secured within the control device at the control surface 12 with a compression spring 70, (normally uncompressed) lock-nuts 72 and a ball-socket joint formed by a semicircular ball 74 and socket 76 formed in the bottom of control surface 12. Adjusting the position of the lock-nut 72 on the threaded portion of the control shaft 14 increases or decreases the compression of the spring 70 and thereby the amount of force which is coincidentally applied to the said ball-socket joints 56–58 and 74–76. This force is adjusted so that the control shaft 14 moves easily within the control surface opening 11 and yet will remain at rest in any position within the said opening. The amount of this force or tension is that necessary to counteract the combined forces of compression springs 36, 38 and 40 acting against the operating plate 48 unless the sum total of friction coefficients developed at the said ball-socket joints.

In the control device of this invention, the control rods can be directly connected to the coordinate functions being controlled or indirectly connected to the functions being controlled by means of control elements. In FIGS. 4(A) and 4(B) two simple methods of such indirect control are illustrated wherein the control element is a potentiometer (only one control element is shown — others would be similar). FIG. 4(A) shows a potentiometer 78 secured to the control base 16 by means of an "L" bracket 80 and other suitable hardware. Potentiometer 78 has a wiper element shaft 82 which is rotatable about its axis as a result of the movement of the control rod 18. A lever 84 is secured to the wiper shaft 82 at a right angle to the axis of said wiper shaft 82. When control rod 18 is depressed, lever 84 is depressed rotating wiper element shaft 82 thereby changing the resistance of potentiometer 78. Return movement of the shaft 82 is accomplished by action of spring 86 (normally compressed) on the lever 84 when control rod 18 is raised.

FIG. 4(B) shows a similar potentiometer 88 and "L" bracket 90. The potentiometer has a shaft 92 which is rotated by means of gear 94 which is driven by control rod 18. In this example the lower end 96 of control rod 18 is formed into teeth. Sleeve bushing 24 is modified in this example to include a semi-circular cut-out 98. This cutout exposes the teeth of rod 18 and permits engagement of said teeth with gear 94. Rotation of the potentiometer wiper element shaft 92 is accomplished by action of the said teeth in contact with corresponding points on the gear 35 as the control rod 18 is moved up or down by operating plate 48 as hereinbefore described.

FIG. 5 shows a simple electrical circuit using potentiometers as control elements. In this circuit RX, RY and RZ represent potentiometers operated by the control rods 18, 20 and 22 respectively. $RX^1$, $RY^1$, and $RZ^1$, and $RX^2$, $RY^2$, and $RZ^2$ represent other resistances in the circuit such as the unused portion of the potentiometers when a mechanical configuration such as is shown in FIG. 4 is employed and are intended to include any balancing resistors needed to effect an electrical balance. The circuit is designed so that the three legs of the circuit, $(RX + RX^1 + RX^2)$, $(RY + RY^1 + RY^2)$, $(RZ + RZ^1 + RZ^2)$ which are all linear voltage dividers across the power supply $V_e$, are essentially equal. The external devices to be controlled are represented as RLX, RLY, and RLZ respectively. Each of these external devices is connected to the negative terminal of voltage source, $V_e$. RLX, RLY, and RLZ are individually and respectively connected to the variable portion of voltage dividers RX, RY AND RZ. Moving any voltage divider in the direction of the positive terminal of the voltage source $V_e$ places an increasingly positive voltage across the external device associated with the divider. Moving any voltage divider in the direction of the negative terminal of voltage source $V_e$ will place a decreasing positive voltage across the external device. The differences in voltage across the external device are employed to control the device.

The external devices RLX, RLY and RLZ of FIG. 5 are controllable sections of an electronic system. Each section accepts a linear control voltage which at its most positive level places the section in its "off" state and at its least positive level places the section in its "on" state. The intermediate voltage levels cause a corresponding linear change in each section's output between fully "off" and fully "on". In actual operation of the control device of this invention, control shaft 14 of the control device can be moved as heretofore described along the line X/Y to a mid-position on the line X/Y and finally to position Z within the control surface opening 11. Such a movement of the control shaft 14 moves operating plate 48 (control means) which in turn moves control rods 18, 20 and 22 in the relationship previously described. The movement of the control rods is transmitted by the variable potentiometers connected thereto into control voltages which would, at the mid-position X/Y have the X and Y controllable sections of the hypothetical electronic system at their 50 percent output levels and the Z controllable section remaining in its "off" state. At the mid-position (control shaft 14 centered between apex positions X, Y and Z of the control surface opening 11) the X, Y and Z controllable sections of the said system are each at 1/3 of full output level. Finishing the described movement (control shaft 14 at rest at apex point Z) the X and Y sections fully "off" and Z section fully "on".

The control device of this invention is particularly useful in control of video mix systems, it is clear that its use is not so limited. Thus, the device can be used to control coordinate functions responsive to control elements such as variable electrical or electrical components, pneumatic devices for mechanical control systems and the like.

While the device has been illustrated employing an equilateral triangle as the shape for the control surface opening, it is clear that other multi-apex angle openings such as a square, or another four apex angle configuration or an opening having five or more apex angles can be employed.

What I claim and desire to protect by Letters Patent is:

1. A device for changing the relative values of at least three coordinate functions to be controlled, said device having in combination:

a. a housing having a control base and a control surface spaced from and parallel to said control surface, said control surface having a multi-apex angle opening having at least three angles, the number of angles in said opening corresponding to the number of functions being controlled;

b. a control shaft mounted for movement in the control base and extending from the control base through the opening in the control surface;
c. a multiplicity of motion transmitting control elements communicatively connected to functions to be controlled, said control elements positioned in said base parallel to the control surface, said elements corresponding in number and position to the number and position of the apex angles in the control surface; and
d. a control means moving in response to movement of the control shaft for simultaneously transmitting motion to the control elements in the same relationship as the relationship defined by the relative position of the control shaft to each apex angle in the opening of the control surface, said motion being transmitted to each control element by said control means when the control shaft is being moved in in a direction toward or away from an apex angle of the opening in the control surface corresponding to a control element.

2. The device of claim 1 in which the control means moving in response to the control shaft is a plate secured to the control shaft, the plane of said plate intersecting the axis of the control shaft at an angle of 90°.

3. The device of claim 2 in which the motion transmitting control elements are spring activated elements secured in the control base of said device and capable of reciprocating motion relative to said control base.

4. The device of claim 3 in which the multi-apex angle opening is an equilateral triangle.

5. The device of claim 3 in which the motion transmitting elements are each communicatively connected to a function to be controlled, through a variable resistor in an electrical circuit.

* * * * *